United States Patent [19]

Williams

[11] Patent Number: 5,645,383
[45] Date of Patent: Jul. 8, 1997

[54] BLIND RIVET

[75] Inventor: Graham Frank Harry Williams, West Midlands, United Kingdom

[73] Assignee: Emhart Inc., Newark, Del.

[21] Appl. No.: 604,636

[22] Filed: Feb. 21, 1996

[30] Foreign Application Priority Data

Mar. 1, 1995 [GB] United Kingdom ............ 9504095

[51] Int. Cl.$^6$ ............................. F16B 13/04; F16B 19/08
[52] U.S. Cl. .................... 411/43; 411/38; 411/501
[58] Field of Search .................... 411/38, 43, 69, 411/70, 501; 29/525.1, 525.2

[56] References Cited

U.S. PATENT DOCUMENTS

| 4,958,971 | 9/1990 | Lacey et al. ............... 411/43 X |
| 5,248,231 | 9/1993 | Denham et al. ............ 411/38 X |
| 5,496,140 | 3/1996 | Gossmann et al. ........... 411/43 |

FOREIGN PATENT DOCUMENTS

| 0168355 | 1/1986 | European Pat. Off. . |
| 0536957 | 4/1993 | European Pat. Off. . |
| 1218617 | 1/1971 | United Kingdom . |
| 2200422 | 8/1988 | United Kingdom . |
| 2260585 | 4/1993 | United Kingdom . |

*Primary Examiner*—Neill R. Wilson
*Attorney, Agent, or Firm*—E. D. Murphy

[57] ABSTRACT

A blind rivet comprising a mandrel 2 and a sleeve 3 is provided with two external grooves 11, 12 of different cross-section. This enables the rivet to set on the blind side of a workpiece to form a taper 19 increasing in diameter towards the blind side of the workpiece 20.

6 Claims, 2 Drawing Sheets

5,645,383

BLIND RIVET

FIELD OF THE INVENTION

The invention is concerned with an improved blind fastener, such as a blind rivet.

A blind rivet is a hollow rivet, which in use is located in a hole in a workpiece and has a head which abuts a first accessible side of the workpiece. The rivet is set at a second inaccessible or blind side of the workpiece by the application of a pull type mandrel which engages the rivet at the blind side of the workpiece and projects out from the head of the rivet. Blind riveting may be used to secure two or more workpieces together, or to provide some other function, such as an anchorage for attachment.

The present invention is particularly concerned with the setting mechanism of the rivet at the blind side of the workpiece.

DESCRIPTION OF THE PRIOR ART

In blind rivets, such as those described in GB 1 218 617 it is known to provide a rivet sleeve with a plurality of grooves. During the setting operation these grooves collapse or fold, thus providing resistance to the pull of the mandrel further causing the rivet body to enlarge in a tapering fashion away and narrowing from the grooves towards the blind side of the workpiece. The rivet body thus becomes wedged in the blind side workpiece hole preventing further hole filling particularly in the workpiece hole adjacent to the rivet body head and results in a relatively low clamping force on the workpiece plates. In addition, therefore, the joint will be weak in resisting tensile and shear forces in the workpiece, these forces acting to further loosen the joint.

Blind rivets, particularly closed end rivets, are limited to the extent of the blind side expansion on setting to the displacement radially outwards by the action of the mandrel, in particular the mandrel head, pulling through the rivet body until it reaches the proximity of the blind side face of the workpiece. In known rivets, the amount of the expansion is essentially the difference between the bore of the rivet and the mandrel head diameter. For this reason, the use of such rivets is problematical when setting in oversize holes, irregularly shaped and slotted holes, and when used with softer materials.

SUMMARY OF THE INVENTION

According to the present invention a blind fastener comprises a hollow sleeve having a shank, a flange at one end, and an abutment surface at the other, and a mandrel having a pulling stem and an enlarged head adapted to engage the abutment surface and cause the sleeve shank to expand outwards to form a blind head and the mandrel is pulled through the sleeve, characterised in that the hollow sleeve is provided with two external grooves of differing shape.

Preferably of the two external grooves, a first is of trapezoidal cross-section, and a second is of elliptical cross-section.

Preferably the second groove is located between the first groove and the flange.

According to a second aspect, the present invention provides for a method of fastening comprising providing a hollow sleeve having a shank, a flange at one end and an abutment surface at the other and a mandrel having a pulling stem and an enlarged head such that by pulling the mandrel through the sleeve the enlarged head engages the abutment surface and causes the sleeve shank to expand outwardly to form a blind head characterised by providing two external grooves of differing shape on the hollow sleeve.

This results in extending considerably the radial extension on the blind side of the rivets, thus solving the problems of setting rivets in oversize holes, irregular shaped and slotted holes, and softer materials.

BRIEF DESCRIPTION OF THE DRAWINGS

The invention will now be described, by way of example only, with reference to the accompanying drawings, in which.

DESCRIPTION OF THE PREFERRED EMBODIMENT

Figure 1:
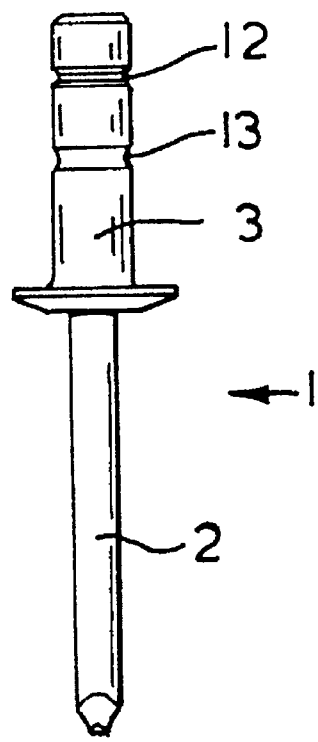
FIG. 1 shows a closed end rivet according to the present invention.
Figure 4:
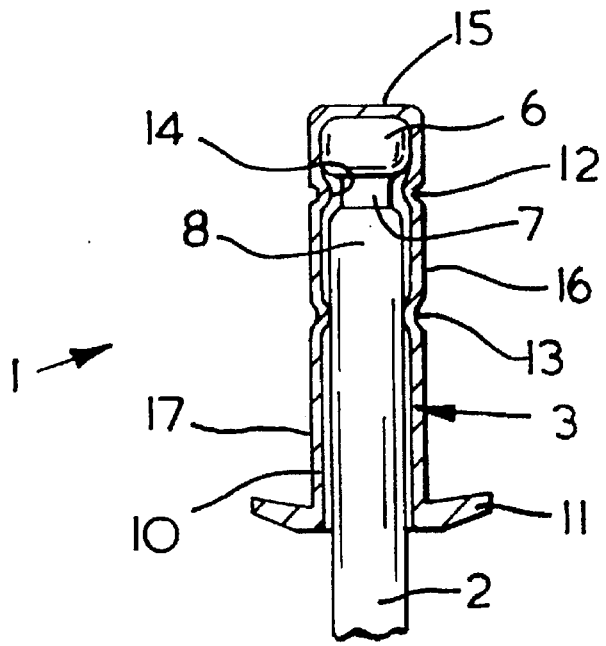
FIG. 4 shows a cross-section of the rivet of FIG. 1.

Referring to FIGS. 1 and 4, there is shown a closed end blind rivet 1, comprising a mandrel 2 and a sleeve 3.

The mandrel comprises a pulling head 6, and a stem 8 by which the mandrel will be pulled joined to the mandrel head 6 by a region of reduced diameter or breakneck 7.

The sleeve 3 is in the form of a blind sleeve 10 provided with a flange 11. The sleeve 10 is provided with first and second grooves 12, 13 dividing the tube into a closed end 15, an intermediate portion 16 between the grooves, and a plain portion 17 between the flange 11 and the second groove 13. The first groove 12 forms an abutment surface 14 in the interior of the sleeve 10.

In use, the mandrel head 6 is held in position by this abutment surface 14.

Figure 2:
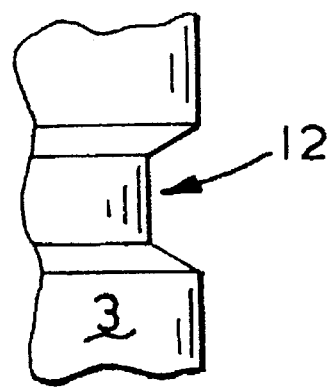
FIG. 2 shows a first groove of the rivet sleeve of FIG. 1.

With reference to FIG. 2, it can be seen that the first groove 12 is polygonal in shape.

Figure 3:
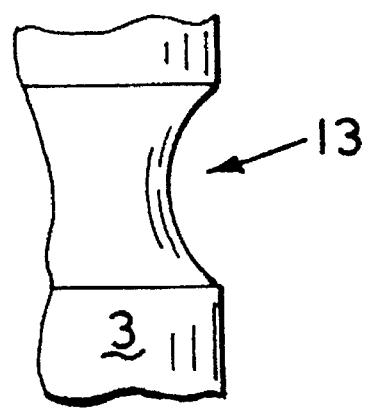
FIG. 3 shows a second groove of the rivet sleeve of FIG. 1.

With reference to FIG. 3, it can be seen that the second groove 13 is elliptical in shape.

The shape of the second groove 13, in the embodiment shown being of reduced diameter has a lead in of approximately 60° from the outer surface to the reduced diameter on both sides. It will be understood that the width of the groove and the lead in angles may vary. Also the position of the second groove 13 relative to the flange 11 of the rivet sleeve may change to accommodate various grip ranges of workpiece material.

The first groove 12 is positioned, so that, upon setting, the rivet sleeve material is rolled under the mandrel head 6 where there is space available, usually at the breakneck 7.

It will be noted that the material hardness of each groove is greater than that of the rest of the rivet sleeve.

On setting, the mandrel stem is pulled to cause the rivet sleeve to deform to hold a workpiece between the flange of the rivet sleeve and the deformed portion or expanded blind head of the rivet sleeve.

Figure 5:
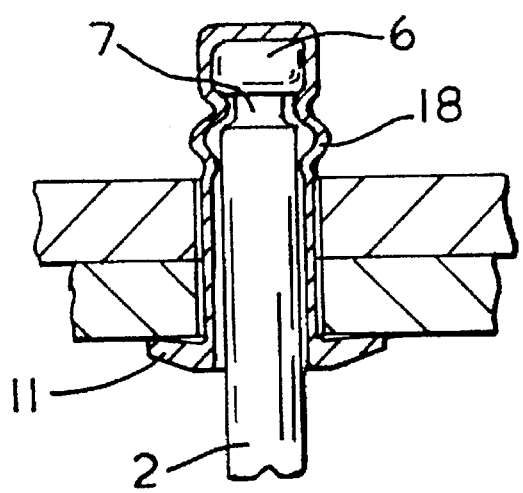
FIG. 5 shows the rivet of FIG. 4 in a partially set condition.
Figure 6:
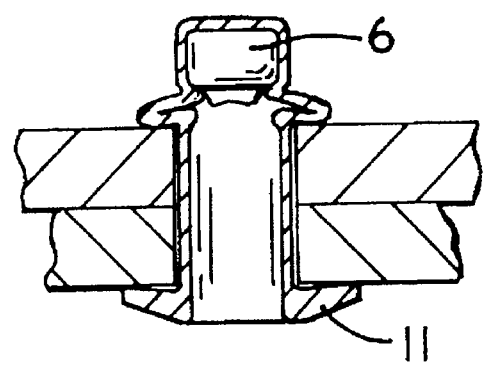
FIG. 6 shows the rivet of FIG. 4 when set.

At commencement of setting the mandrel head movement imposes an axial load on the rivet sleeve. As stated the rivet sleeve material is rolled under the mandrel head. Further movement of the mandrel causes the sleeve adjacent the second groove 13 to begin to move radially outwards in a fold 18 supported by the harder material of this groove, as shown in FIG. 5. The shape of the fold shows a considerable taper increasing in diameter away from the closed end 15 of the rivet sleeve 3, and in particular from an area of reduced diameter where the sleeve has been rolled under the mandrel head locking the mandrel head in position.

With further setting, the folding and radial movement increase.

Continued setting, until the mandrel fractures, expands the plain portion 17 of the rivet sleeve 3 between the flange 11 and the second groove 13. The plain portion 17 becomes shorter and good hole filling results.

The interaction of the mandrel with the rivet body and the resulting material flow gives superior blind side expansion, superior pulling together of the workpieces and excellent clamping load.

While the embodiment illustrated concerns a closed end rivet, the invention is equally applicable to other blind rivets.

Since the blind rivet does not have a grooved mandrel, other than at the breakneck, it provides for a mandrel which is common to all grip ranges accommodated by a particular rivet body.

The positioning of the grooves and the groove forms give a substantial blind side spread which is not only in contact with the blind side workpiece, but also generates a high clamping force. This is achieved by the positioning of the first groove in relation to the blind side workpiece face such that in operation as the setting load increases, the groove collapses inwardly, narrowing as it does so, providing a pivot point about which the material in the rivet sleeve bends. This encourages the rivet sleeve material to flow outwardly towards the workpiece face and grow substantially in diameter as it does so.

It has been found that the maximum pulling together of the workpieces and clamp characteristics can be obtained when the elliptical bottom groove is between 1 mm from the bottom of the groove to the workpiece surface and 1 mm from the top of the groove to the workpiece surface.

Preferably the groove beneath the mandrel head is trapezoidal. This shape has been found to be inherently strong and not prone to collapse. Thus mandrel head pull is resisted to a greater extent and this in turn provides a higher clamp up load.

By virtue of the improved blind spread and the shape of the fold being downwardly disposed, the resultant clamping force will have improved resistance to tensile forces.

I claim:

1. A blind fastener comprising a hollow sleeve having a shank, a flange at one end, and an abutment surface at the other, and a mandrel having a pulling stem and an enlarged head adapted to engage the abutment surface and cause the sleeve shank to expand outwards to form a blind head as the mandrel is pulled through the sleeve, characterized in that the hollow sleeve is provided with two external grooves of differing shape, the first of said two external grooves being of trapezoidal cross-section, and the second being of elliptical cross-section.

2. A blind fastener according to claim 1, characterized in that the second groove is located between the first groove and the flange.

3. A blind fastener comprising a hollow sleeve having a shank, a flange at one end, and a first external groove adjacent the other end, a wall of said first groove providing an internal abutment surface within said sleeve, and a mandrel having a pulling stem and an enlarged head adapted to engage said abutment surface and cause the sleeve shank to expand outwards to form a blind head as the mandrel is pulled through the sleeve, characterized in that said first external groove is of trapezoidal cross-section and that said hollow sleeve is provided with a second external groove of differing shape.

4. A blind fastener according to claim 3, characterized in that said second external groove is of elliptical cross-section.

5. A blind fastener according to claim 4, characterized in that said second groove is located between said first groove and said flange.

6. A method of fastening comprising providing a hollow sleeve having a shank, a flange at one end and an abutment surface at the other, providing a mandrel having a pulling stem and an enlarged head pulling the mandrel through the sleeve such that the enlarged head engages the abutment surface and causes the sleeve shank to expand outwardly to form a blind head characterized by providing two external grooves of differing shape on the hollow sleeve, a first of said grooves being located adjacent said mandrel head to provide said abutment surface and being trapezoidal in cross-section, and a second of said external grooves being elliptical in cross section.

\* \* \* \* \*